United States Patent
Sällberg

(10) Patent No.: US 8,185,580 B2
(45) Date of Patent: May 22, 2012

(54) METHOD FOR HANDLING DIFFERENT VERSIONS OF AN APPLICATION, AND AN AUTOMATION SYSTEM

(75) Inventor: Stefan Sällberg, Malmö (SE)

(73) Assignee: ABB AB, Västerås (SE)

( * ) Notice: Subject to any disclaimer, the term of this patent is extended or adjusted under 35 U.S.C. 154(b) by 270 days.

(21) Appl. No.: 12/281,336

(22) PCT Filed: Feb. 28, 2007

(86) PCT No.: PCT/SE2007/000188
§ 371 (c)(1),
(2), (4) Date: Jan. 21, 2009

(87) PCT Pub. No.: WO2007/100291
PCT Pub. Date: Sep. 7, 2007

(65) Prior Publication Data
US 2009/0222513 A1 Sep. 3, 2009

(30) Foreign Application Priority Data
Mar. 2, 2006 (SE) ........................................ 0600448

(51) Int. Cl.
*G06F 15/16* (2006.01)
*G06F 12/00* (2006.01)
(52) U.S. Cl. .......................... 709/203; 709/220; 717/170
(58) Field of Classification Search ................. 709/220, 709/221, 217–219, 225–229, 250, 203; 717/170
See application file for complete search history.

(56) References Cited

U.S. PATENT DOCUMENTS

| | | | |
|---|---|---|---|
| 5,274,815 A * | 12/1993 | Trissel et al. ................. | 712/226 |
| 5,613,130 A * | 3/1997 | Teng et al. ..................... | 713/300 |
| 6,298,478 B1 | 10/2001 | Nally et al. | |
| 6,505,247 B1 | 1/2003 | Steger et al. | |
| 6,769,009 B1 | 7/2004 | Reisman | |
| 6,950,863 B1 * | 9/2005 | Pham et al. ................... | 709/221 |
| 7,035,767 B2 * | 4/2006 | Archer et al. ................. | 702/183 |
| 2002/0116453 A1 | 8/2002 | Todorov et al. | |
| 2003/0037282 A1 * | 2/2003 | Berg et al. ....................... | 714/11 |
| 2005/0033802 A1 | 2/2005 | Pauly et al. | |
| 2005/0120346 A1 * | 6/2005 | Sprigg .......................... | 717/176 |
| 2008/0319555 A1 * | 12/2008 | Meyer et al. ..................... | 700/11 |
| 2009/0069906 A1 * | 3/2009 | Norberg et al. ................. | 700/81 |

FOREIGN PATENT DOCUMENTS

| | | |
|---|---|---|
| WO | WO-00/77583 A | 12/2000 |
| WO | WO-00/77592 A2 | 12/2000 |
| WO | WO-0223364 A1 | 3/2002 |

OTHER PUBLICATIONS

PCT/ISA/210—International Search Report—Jun. 26, 2007.
European Search Report—May 7, 2010.

* cited by examiner

*Primary Examiner* — Zarni Maung
(74) *Attorney, Agent, or Firm* — Venable LLP; Eric J. Franklin

(57) ABSTRACT

A method in an automated system for handling at least two versions of an application. The system includes a controller for automation of a process with the application stored thereon in bidirectional connection with a communication server. The communication server is in bidirectional connection with at least two clients. The method improves communication between a communication server and several clients. Graphics and images can be displayed without reconfiguration when a new version of an application is used.

19 Claims, 2 Drawing Sheets

METHOD FOR HANDLING DIFFERENT VERSIONS OF AN APPLICATION, AND AN AUTOMATION SYSTEM

FIELD OF THE INVENTION

The invention relates to the field of automation, and in particular to a method for handling different versions of an application as defined in the preamble of claim 1 and to an automation system as defined in the preamble of claim 11.

BACKGROUND OF THE INVENTION

Automatic control or automation is very important within industrial production, for example in order to eliminate monotonous tasks and lessen hazardous elements in a production line. In general automation also increases the efficiency as well as the quality of a process and is an excellent means to meet today's demands for non-environmental influence and economical production.

Today, most process industries such as food processing, energy or power generating plants, pharmaceutical and chemical industries are indeed more or less automated, that is, have automatic, computerised control, operation and management. The programme code used in these computerized machines and processes are subject to continuous development in order to meet changing demands. Regular updates of system software are therefore necessary for improving existing routines as well as for correcting shortcomings of the routines used.

When such updates are to be made, the version presently being used is overwritten by the new, upgraded version. This can bring about serious problems should the new version not be adequately downloaded, if the new version contains bugs or if it is non-functioning or if it contains unforeseeable incompatibilities with the system, for example leading to instabilities within the system. Should a need to revert to the old version arise, this previous code has to be downloaded again. The production could then possibly halt until the old version is up and running again. Such interruptions in production are very expensive, or could even, depending on the industry in question, be dangerous.

The above-described problems are an issue for example when implementing applications in a controller, such as a process controller or a programmable logic controller (PLC), and upgrading such applications, the controllers being a crucial part of most automation systems. It is difficult to foresee whether a new version of a control application would be functioning in a real environment, and if it is not functioning, it is almost impossible to know which part of the application is not functioning satisfactory.

The results obtained from an automation process are often displayed to a user or operator, and it is important for the user to be able to follow the progress of a process. When changing versions, it is still important to be able to display the results to the user, and a problem caused by the fact that an upgrading of an application results in the previous version of the application being deleted or overwritten is that it takes time to reconfigure different parts of the application. Accordingly, when a previous version of the application is deleted or overwritten, so is for example the graphics related to it. There is thus a period of time between the changes of different versions during which, for example, the graphics shown is not related to the current version, but to the previous version. Depending on the automation system in question such time periods could be only an unwanted disturbance or it could be dangerous and lead to grave consequences. This shortcoming grows worse when there is a need to switch back and forth between different versions, since the problem is repeated for each changeover.

SUMMARY OF THE INVENTION

An improved way to perform an upgrading of a version of an application is to execute two versions in sequence or in a quasi-parallel way, as is described in the co-pending patent application entitled "Method for evaluating, an automation system, and a controller", assigned to the same applicant and filed on the same day as the present invention.

Today, when downloading a new version of an application and thereby deleting the previous version, there is no functioning communication between a controller and a user station, or client, utilising a previous version since the client tries to retrieve data from the non-existing previous version. When implementing the execution of two versions of an application in order to solve this, a difficulty arises in that when executing the versions in the same controller there is a need to know from which version to retrieve data.

It is an object of the present invention to provide a method for ensuring that when two or more versions of an application are executed in a single controller, data from a correct version of the application is retrieved.

This object, among others, is achieved by a method as claimed in claim 1 and by an automation system as claimed in claim 11.

In accordance with the invention a method is provided in an automated system for handling at least two versions of an application. The system comprises a controller, such as a process controller or a programmable logic controller, for automation of a process by means of the application that is stored thereon. The controller is preferably in bidirectional communication with a communication server, and the communication server is in turn in bidirectional connection with at least two clients. In accordance with the method at least two versions of the application is executed in the controller. The clients utilising a respective one of the versions requests values for a certain variable related to the process. The requested variable is requested under the same variable name for all versions. Lastly, the communication server retrieves a respective value for the requested variable, and transmits the values to a respective client. By means of the invention a very convenient way of handling the communication to/from several versions of an application stored within a controller is provided, and more particularly, an independent communication for each version is enabled, whereby the controller always knows what data to retrieve, i.e. data related to the version in question, although the data is requested under the same variable name. For example, graphics corresponding to an application and illustrating for example the values of a process variable can be seen immediately as a new version is being executed without a need to reconfigure it. The displayed image or graphics is updated instantly as a new version begins to control processes within the automation system. Thus, the invention ensures that there is a continuing and functioning communication with all versions of an application. Further, such communication is enabled in a simple manner.

In accordance with an embodiment of the invention each of the clients specify to the communication server which version it is utilising. This specification can be made in any suitable way, for example by defining an environment (e.g. a production environment, an evaluation environment, a previous environment) they are in.

In accordance with an embodiment of the invention, the communication server links each client to a respective version based on the specification made by the respective client. This linking could be accomplished in any desired manner and enables the communication server to retrieve correct data to a respective client, although the data is being requested by utilising the same variable name.

In accordance with an embodiment of the invention, the communication server requests data from a specific version of the application in the controller, for example by utilising a unique address. In accordance with a further embodiment of the invention, the data is requested on behalf of a client. This enables a reliable way for the communication server to know which version to retrieve data from and is therefore able to deliver correct data to a client without any interaction from the client, and thus provides a very convenient way for a user to access different versions of an application.

In accordance with another embodiment of the invention, the controller signals to the communication server when a version not controlling a process is ordered to take control of the process. The communication server is thereby informed about which version is controlling the processes, and can easily redirect data required by a client. That is, a client supervising the processes receives data from the version controlling the processes even after a change of version.

In accordance with yet another embodiment of the invention, the communication server is an OPC server. This is a well-known server commonly used within automation systems, whereby the method in accordance with the invention can be implemented in existing and widely used systems.

In accordance with still another embodiment of the invention, an OPC handler is provided for each client. An OPC handler conveys data to the OPC server specifying which version the respective client is executing, and a user utilising such OPC handler is able to always retrieve accurate data from correct version.

The invention also relates to such a system, whereby advantages similar to the above are achieved.

DETAILED DESCRIPTION OF PREFERRED EMBODIMENTS

Figure 1:
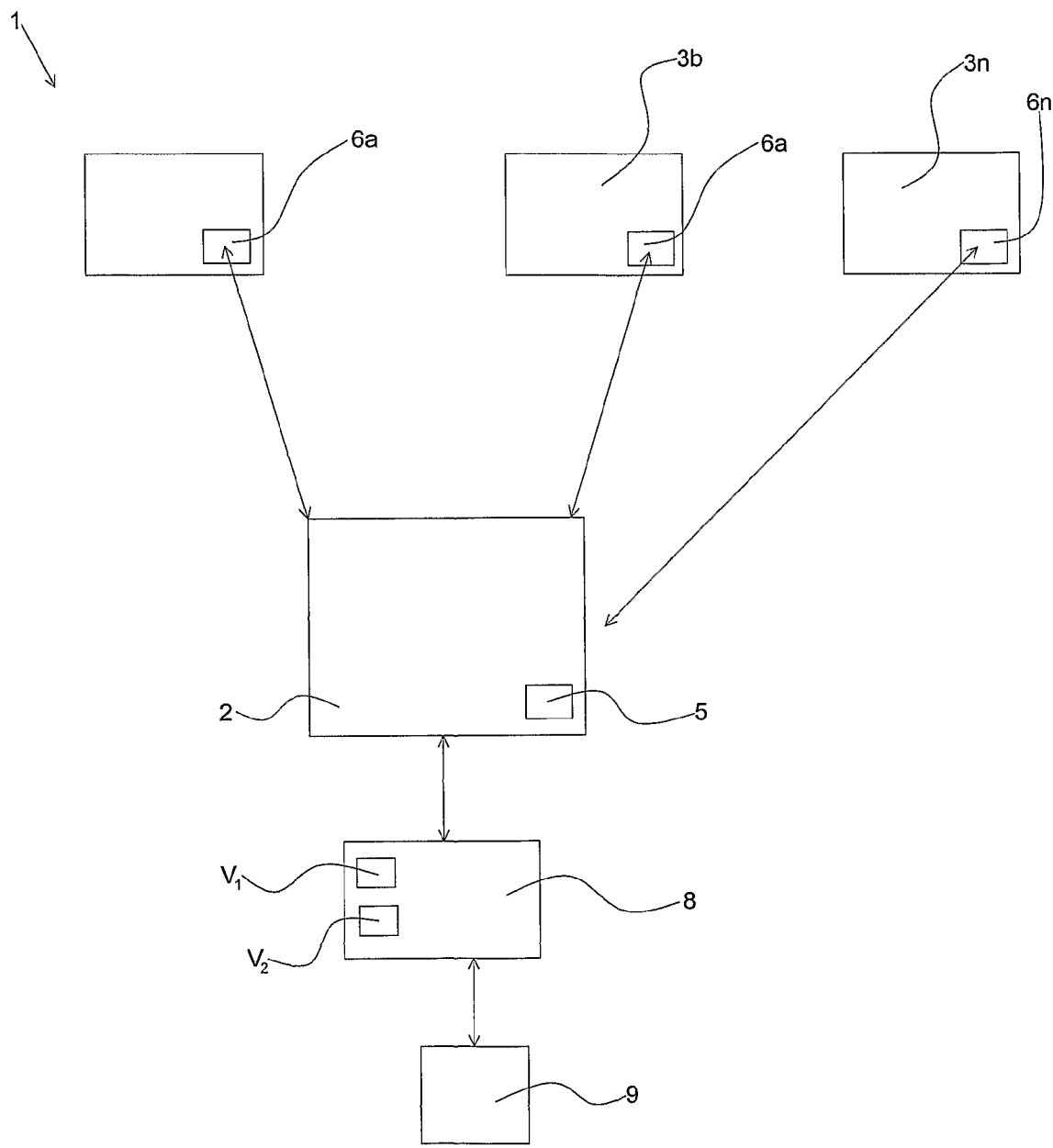
FIG. 1 shows an overview of an automation system in which the present invention may be implemented.

In a typical industrial plant having an automation system, control systems are used in order to monitor and control device parameters, such as the level of a tank, the temperature of a fluid in a process or the opening of a valve. In most such industrial plants there is a centralized control place and the user typically has access to several operator stations displaying different environments. Each station has a graphical user interface and the operator is able to supervise a process by means of graphical representations of real world devices.

One way to improve the upgrading of a version of an application controlling a process is to execute two versions in the same controller, as is described in the co-pending patent application entitled "Method for evaluating, an automation system, and a controller", assigned to the same applicant as the present invention and incorporated herein by reference. In short, in accordance with the referenced co-pending patent application, a method for evaluating an application within a controller controlling a process within an automation system is described. The controller has two or more versions of an application stored therein and actual process parameters are input to all of the different versions, but only the results from the application currently controlling the process are used as output in order to control the process. A user is thereby able to ensure that a new version of an application to be installed is functioning under actual process conditions, before launching the new version.

When two or more versions of an application are executed in a controller such as a programmable logic controller (PLC), graphics, different dialogue images (faceplates), graphic representation of trends in a process and so on, must retrieve data from the correct version of the application, as was mentioned earlier. An operator or user supervising an automation process, for example at a centralized control place as was described above, has to retrieve data from the version controlling a physical Input/Output (I/O) device, which in turn outputs commands to the process, for example commands to the effect of opening a valve or adjusting the level of a tank. Another user may want to evaluate a new version of the application and should retrieve data from such new version and not from the version controlling the process. Yet other users may need to retrieve data from additional versions for some reasons.

In accordance with the present invention a method and system is provided for enabling an automatic, and thereby an easy and very convenient way of handling two or more different versions that are being executed within a controller.

In order to facilitate a thorough understanding of the present invention, some constituent parts or devices are briefly described. OPC (OLE for Process Control) is a standard developed by an industrial automation industry task force and an OPC server is a server handling OLE (Object Linking and Embedding) applications. An OPC server generally provides a method for many different software packages or applications to access data from a process control device, such as a programmable logic controller. OPC servers use OLE technology to communicate with OPC clients. In the following OPC server and OPC clients are used throughout the description as examples of a communication server and client, respectively, but this is not intended to limit the scope of the invention. It is to be understood that any communication server can be utilised, as can any client.

FIG. 1 shows a schematic outline of an automation system 1 in which the present invention can be utilised. The OPC clients 3a, 3b, . . . , 3n in this exemplary embodiment can be different user stations or operator workplaces (such as a personal computer (PC) for example) displaying different environments. For example, OPC client 3a could be a user station having a production environment in which an active version controlling the processes is utilised; client 3b could be an engineer station having an engineering environment and executing a version of a new application for evaluation before it replaces the active version; and client 3n could be another station having a previous environment and executing an old version of an application. A user working in a previous environment may want to retrieve data from other versions, such as an old version not currently controlling an I/O device and used in order to have a back-up version available. A user utilising an old version is able to see values of the old version after it is no longer controlling the I/O device, which can be convenient sometimes and needed as a safe revert function. The OPC clients 3a, 3b, . . . , 3n are connected to an OPC server 2 and a bidirectional link exists between them.

When executing several versions of an application in a controller, graphics, different dialogue images (faceplates), graphic representation of trends in a process and so on, must retrieve data from the correct version of the application, as was mentioned earlier. An operator supervising an automation process may want to supervise graphics related to such process. For example, the user may wish to supervise a tank level and monitors therefore graphics showing such level. In the following a tank level is used as an illustrating example of a variable to be monitored. It is understood that the tank level is used only as an illustrating example and that other processes and related variables can be utilised. Further, it is understood that the values of a tank level does not generally differ for different versions, but the actions taken based on the values may differ; the tank level could for example be increased according to one version but not according to another version, whereby a valve controlling the level is adjusted in one version but not the other. However, for simplicity of the description a variable name "Tank_level" is used throughout. The graphics related to the tank level, for example a graph, retrieves a variable "Tank_level". The client being operated in a production environment then has to retrieve data, i.e. the value of "Tank_level" from the version controlling a physical Input/Output (I/O) device, which in turn output commands to the process, for example commands to the effect of adjusting the level of a tank. As was mentioned above other users may want to evaluate a new version of the application and should retrieve data from such new version and not from the version controlling the process. The users not supervising the actual processes, for example a user evaluating a new version, may still want to monitor the tank level and the graphics related to it should still refer to a variable called "Tank_level". However, the actual values of the variable "Tank_level" could of course differ since the values are related to different versions of the application. Thus, in accordance with the invention the same variable name is used in the different versions, but values for the same variable are retrieved in dependence on the version in question. The invention thus makes it possible to eliminate the need to reconfigure the graphics related to a certain process. New variables may of course be introduced into a new version, and others may be removed, but the variables in common for the versions have the same variable name.

An innovative OPC handler $6a$, $6b$, ..., $6n$ in accordance with the invention is provided for each of the OPC clients $3a$, $3b$, $3n$. The OPC handlers $6a$, $6b$, ..., $6n$ specify which environment a OPC client is operated in, and thereby the OPC server knows which version to get data from; for example, the OPC client $3a$ has an OPC handler $6a$ comprising information about the OPC client $3a$ being operated in a production environment and thereby information about which application version $V_x$ is to be used, i.e. which variable values to retrieve. Since the OPC client $3a$ is operated in a production environment, this is presumably the version controlling the processes. Similarly, an engineer working in an engineering environment should receive variable values from the newest version, i.e. the version being evaluated; and an engineer working in a previous environment should receive variable values from an old version. It is realised that other environments than the three described could be similarly used.

The OPC server $2$ is further connected to a controller $8$ in a bidirectional fashion, and communication between these entities is performed in communication packages. Different versions $V_1$, $V_2$ of an application are stored within the controller $8$. The controller $8$ comprises an Input/Output unit $9$, and one of the versions, $V_1$ or $V_2$, is controlling the processes within the automation system $1$. In this exemplary embodiment only two versions $V_1$, $V_2$ are shown; however, it is understood that more than two versions $V_1, V_2, \ldots, V_n$ could be handled in a similar fashion.

In accordance with the invention the OPC server $2$ comprises storage means $5$ for keeping track of which client $3a$, $3b$, ..., $3n$ utilises which version $V_1, V_2, \ldots, V_n$ of an application. The storage means $5$ can be any suitable data storage means, such as ROM (Read only Memory), PROM (Programmable read only memory), EPROM (Erasable PROM), Flash, EEPROM (Electrically EPROM), SRAM (Static RAM) or DRAM (Dynamic RAM). The fact that the OPC server $2$ is aware of which client is in which environment and therefore the values from which version to use, enables the OPC to deliver the correct value of a certain variable (e.g. "Tank_level") to the respective clients.

The controller $8$ stores the respective variable values for the different versions at different memory locations. The OPC server $2$ comprises means for addressing a certain memory location, which memory location contains the correct variable value, and the OPC server $2$ could comprise storage means $5$ for storing such information, and such that the OPC server $2$, by means of the addressing, is able to request correct values. The storage means $5$ can be any suitable data storage means, such as any of the above-mentioned types. The addressing could for example include identifiers $ID_1$, $ID_2, \ldots, ID_n$ that are unique for each version $V_1, V_{21} \ldots, V_n$ of an application. However, other addressing methods could be used. The identifiers $ID_1, ID_2, \ldots, ID_n$ could be address values, a globally unique identifier (GUID) (which is generally a string of numbers and/or letters to each piece of data within a system), a time-stamp or any suitable identification means enabling the versions to have its own, unique identifier $ID_1, ID_2, \ldots, ID_n$. The different versions, or really the variable values of the different versions, can thereby be uniquely differentiated from all other versions. The unique identifiers $ID_1, ID_2, \ldots, ID_n$ are included in the communication packages of the communication between the controller $8$ and the OPC server $2$. The OPC server $2$ has always knowledge about which version each OPC client $3a, 3b, \ldots, 3n$ is using, and the controller $8$ may thus always provide data from the correct version to the OPC server $2$, which in turn communicates with the OPC clients $3a, 3b, \ldots, 3n$. All communication can be performed without the user having to define or specify in any way which version to retrieve data from, that is, the user does not have to know the unique identifier for the particular version of the application in the controller $8$ that he or she is using; it is completely transparent for the user.

If, for example, version $V_1$ is the version currently controlling a particular process and it is to be exchanged for a new version $V_2$, the controller $8$ signals to the OPC server $2$ when the two versions $V_1$, $V_2$ switch role in the controller $8$, i.e. when the new version $V_2$ is taking over control of the I/O unit $9$. Thereby the OPC server $2$ has, at all times, knowledge about which version is controlling the I/O unit $9$ of the controller $8$. The OPC server $2$ is thus able to deliver correct data to each OPC client $3a, 3b, \ldots, 3n$. For example, a variable "Tank_level" is requested by clients executing different versions using the same variable name, and the OPC server $2$ points at different memory locations corresponding to the respective values obtained for each version. The OPC server $2$ in turn translates these requests received from the clients $3a$, $3b, \ldots, 3n$ to a memory address and the controller $8$ is thereby able to retrieve the proper values and transmit them to the OPC server $2$, which provides them to the respective clients $3a, 3b, \ldots, 3n$.

An OPC client $3a, 3b, \ldots, 3n$ can subscribe for variable values from a controller $8$ (for example in order to display images of a certain process) without knowing the exact version information and still always receive the correct data from the controller $8$. This is done without the need to subscribe anew and thus no reconfigurations are needed. The subscription is simply redirected in the OPC server $2$ in case the different versions of an application switch role in a controller 8. All this can be done without any interaction from the OPC client 3a, 3b, ..., 3n.

By means of the present invention, graphics does not need to be reconfigured in order to get live data, for example from a process, from the other version of the application.

Figure 2:
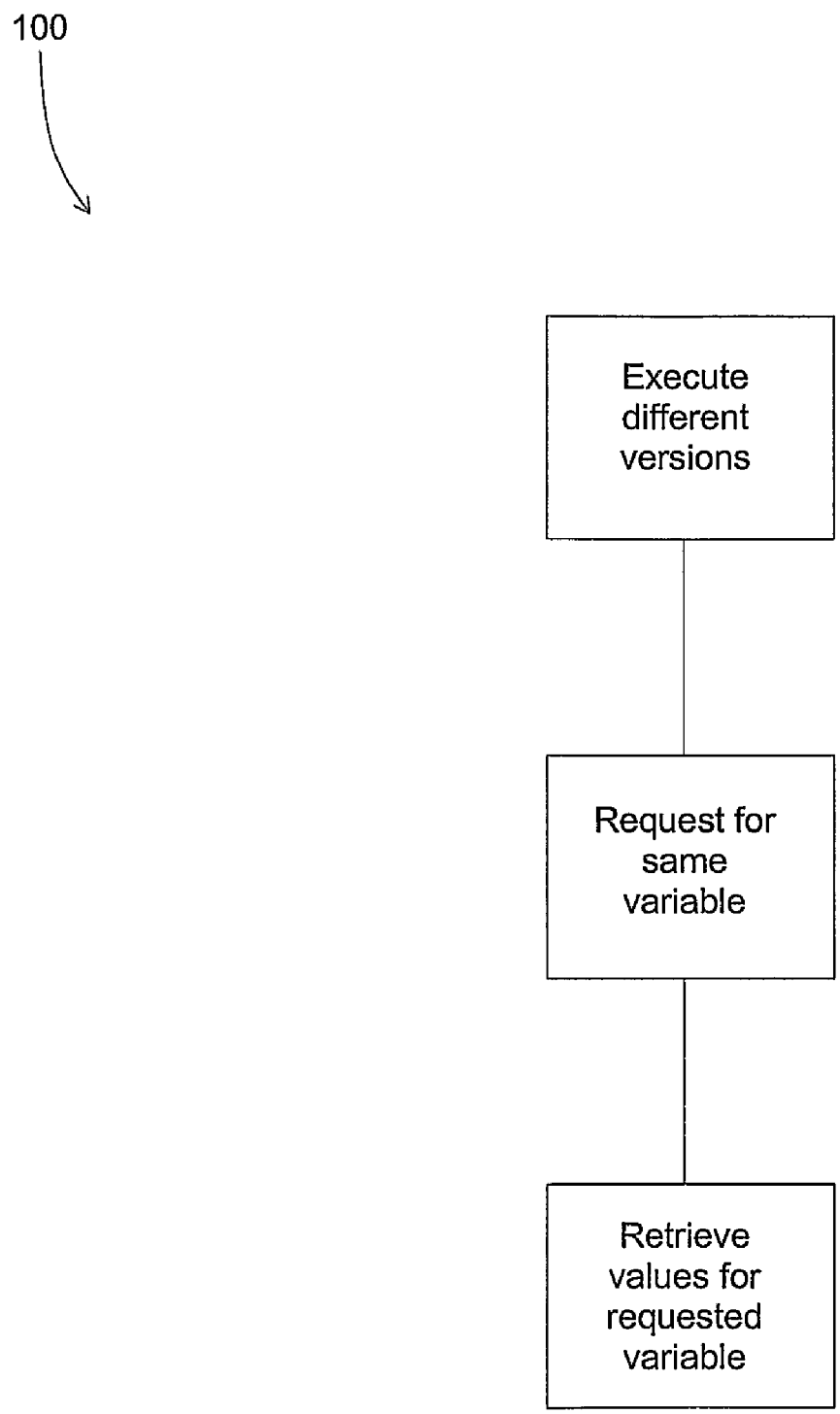
FIG. 2 shows a flow chart of the steps included in a method in accordance with the present invention.

FIG. 2 shows a flowchart of the steps included for performing the method in accordance with the invention. In the method 100 execution of at least two different versions $V_1$, $V_2$, ..., $V_n$ of an application is performed within a controller 8, step 110. In the subsequent step, step 120, at least two clients 3a, 3b, ..., 3n that are utilising different versions $V_1$, $V_2$, ..., $V_n$ request values for the same variable, e.g. a variable "Tank_level", related to a certain process. Thereafter, in step 130, the communication server 2 retrieves a respective value for the requested variable and transmits them to a respective client 3a, 3b, ..., 3n. That is, a value for each version is retrieved and transmitted to the requesting client 3a, 3b, ..., 3n.

By means of the invention independent communication for the different versions $V_1$, $V_2$, ..., $V_n$ is enabled between the controller 8 and the OPC server 2.

In the description it is assumed that the two different versions reside within the same controller. However, in alternative embodiments the versions to be handled reside within different controllers, but the principles as described can still be used, and a user do not need to actively be engaged in the data retrieval, they only need to define within which environment and thus with which version they are working. This definition is easily accomplished by means of the OPC handler 6a, 6b, ..., 6n.

In summary, the invention provides a way of handling problems arising when executing several different versions of an application in a controller. The controller is able to support communication independently for different versions. In accordance with the invention innovative OPC handlers are provided and the fact that the OPC server keeps track of which client is related to which version, communication with two different versions is enabled simultaneously and independently of each other.

The invention claimed is:

1. A method for handling different versions of an application in an automated industrial control system, said system comprising a controller for automation of an industrial process with the application stored therein, said controller being in bidirectional connection with a communication server, said communication server in turn being in bidirectional connection with at least two clients, and said controller being in bidirectional connection with an input/output unit configured to output commands to the industrial process, the method comprising:
executing, in said controller, at least two versions of said application,
requesting, by at least one of said at least two clients utilising a respective one of said at least two versions, values for a variable related to the industrial process and in common for the versions and related to said process, said values being requested utilising a same variable name,
retrieving with said communication server, a respective value for the requested variable, and
transmitting said values to a respective client.

2. The method according to claim 1, wherein each of said clients specifies to said communication server which version said client is utilising.

3. The method according to claim 2, wherein each of said clients specifies the version said client is utilising by defining an environment the client is in.

4. The method according to claim 1, wherein said communication server links each client to a respective version based on the specification made by the respective clients.

5. The method according to claim 1, wherein said communication server is an object linking and embedding for process control server and said clients are object linking and embedding for process control clients.

6. The method according to claim 5, wherein each object linking and embedding for process control client is provided with a respective object linking and embedding for process control handler comprising information about in which environment the object linking and embedding for process control client is working.

7. The method according to claim 6, wherein said object linking and embedding for process control handler conveys data to said object linking and embedding for process control server specifying which environment the respective client is utilising.

8. The method according to claim 1, wherein said controller signals to said communication server when a version not controlling a process is ordered to take control of said process.

9. The method according to claim 1, wherein retrieving a respective value for the requested variable, by said communication server, comprises:
assigning an unique identifier corresponding to each of said at least two versions, and
including said unique identifier in communication packages in communication messages sent between said controller and said communication server.

10. The method according to claim 9, wherein said communication server requests data from a version of the application in the controller utilising said unique identifier.

11. An automation system comprising a controller for automation of an industrial process with an application stored thereon, said controller being in bidirectional connection with a communication server, said communication server in turn being in bidirectional connection with at least two clients, and said controller being in bidirectional connection with an input/output unit configured to output commands to the industrial process, the system comprising:
at least two versions of said application within said controller,
a requesting module in said at least two clients utilising a respective one of said at least two versions, for requesting values for a variable related to the industrial process and in common for the versions and related to said process, said values being requested under the same variable name,
a retrieving module in said communication server for retrieving a respective value for the requested variable, and
a transmitting module configured to transmit said values to a respective client.

12. The system according to claim 11, wherein each of said clients comprises a specifying module configured to specify to said communication server which version said client is utilising.

13. The system according to claim 12, wherein each of said clients is arranged to specify the version said clients are utilising by defining an environment said clients are in.

14. The system according to claim 12, wherein said communication server comprises a linking module configured to link each client to a respective version based on the specification made by the respective clients.

15. The system according to claim 11, wherein said communication server is an object linking and embedding for process control server and said clients are object linking and embedding for process control clients.

16. The system according to claim 15, wherein each object linking and embedding for process control client is provided with a respective object linking and embedding for process control handler comprising information about in which environment object linking and embedding for process control client is working.

17. The system according to claim 15, wherein said object linking and embedding for process control handler is arranged to convey data to said object linking and embedding for process control server specifying which environment the respective client is utilising.

18. The system according to claim 11, wherein said controller is arranged to signal to said communication server when a version not controlling a process is ordered to take control of said process.

19. The system according to claim 11, wherein said communication server further comprises:
a storage module configured to store an unique identifier related to a respective one of said at least two versions, and
an identification module configured to include said unique identifier in communication packages in communication messages sent between said controller and said communication server.

* * * * *